United States Patent
Ishikawa et al.

(10) Patent No.: US 6,176,206 B1
(45) Date of Patent: Jan. 23, 2001

(54) DEVICE FOR SUPPLYING FUEL TO DIAPHRAGM-TYPE CARBURETOR

(75) Inventors: Hirohisa Ishikawa; Hitoshi Abe; Hideo Kurasawa, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/422,083

(22) Filed: Oct. 21, 1999

(30) Foreign Application Priority Data

Oct. 22, 1998 (JP) .................................................. 10-300527

(51) Int. Cl.[7] ...................................................... F02B 33/04
(52) U.S. Cl. ..................................... 123/73 C; 123/DIG. 5
(58) Field of Search ............................. 123/73 C, 73 CC, 123/DIG. 5, 510, 468, 469

(56) References Cited

U.S. PATENT DOCUMENTS

| | | | |
|---|---|---|---|
| 3,045,605 | * 7/1962 | Nutten et al. | ............. 123/DIG. 5 |
| 4,932,370 | * 6/1990 | Schierling et al. | ............. 123/DIG. 5 |
| 5,024,188 | * 6/1991 | Hartke et al. | ............. 123/73 A |
| 5,337,710 | * 8/1994 | Adam | ............. 123/DIG. 5 |
| 5,353,754 | * 10/1994 | Wissmann et al. | ............. 123/73 C |

FOREIGN PATENT DOCUMENTS 10-131807     5/1998   (JP) .

* cited by examiner

Primary Examiner—Thomas N. Moulis
(74) Attorney, Agent, or Firm—Arent Fox Kintner; Plotkin & Kahn PLLC

(57) ABSTRACT

A fuel supply passage leading to a fuel tank is connected to an intake side of a fuel pump of a diaphragm-type carburetor, and a fuel transfer chamber incorporated in an intermediate portion of the fuel supply passage is provided in an insulator interposed between the carburetor and an engine. The fuel pumped from the fuel tank is heated in the chamber moderately, thereby decreasing the difference in temperature between the carburetor and the fuel introduced into the carburetor. Thus, the generation of fuel vapor in the diaphragm-type carburetor can be restrained.

3 Claims, 5 Drawing Sheets

DEVICE FOR SUPPLYING FUEL TO DIAPHRAGM-TYPE CARBURETOR

BACKGROUND OF THE INVENTION

1. Field of the Invention

The present invention relates to a device for supplying fuel to a diaphragm-type carburetor, and particularly, to an improvement in a device for supplying fuel to a diaphragm-type carburetor which includes a constant-pressure fuel chamber which communicates at its outlet bore with a lower end of a fuel nozzle through a fuel jet and a check valve, a fuel pump operated in response to a pulsation pressure in a pulsation pressure generating source to feed the fuel to the constant-pressure fuel chamber, and a fuel-introduction control valve for controlling the introduction of the fuel to the constant-pressure fuel chamber by opening and closing an inlet bore in the constant-pressure fuel chamber, wherein a fuel supply passage leading to a fuel tank is connected to an intake side of the fuel pump.

2. Description of the Related Art

The above diaphragm-type carburetor is already known, as disclosed in, for example, Japanese Patent Application Laid-open No.10-131807.

In the diaphragm-type carburetor as described above, a large amount of fuel vapor may be often generated from the fuel fed from the fuel pump toward the constant-pressure fuel chamber during operation of the engine for a long period of time. If the large amount of fuel vapor is ejected at once from the fuel nozzle, the air-fuel ratio of an air-fuel mixture is extremely reduced, thereby causing a disorder in the operation of the engine.

The present inventors have cleared that the cause of generation of a large amount of fuel vapor from the fuel fed from the fuel pump toward the constant-pressure fuel chamber resides in that there is a very large difference in temperature between the diaphragm-type carburetor mounted to the engine and the fuel pumped from the fuel tank to the fuel pump of the carburetor. More specifically, a diaphragm-type carburetor is generally mounted to an engine through an insulator, but the operation of the engine for a long period of time causes the heat generated in the engine to be gradually propagated to the carburetor through the insulator to heat the carburetor. Therefore, if the fuel having a relatively low temperature is introduced from the fuel tank into the carburetor heated to a relatively high temperature, the fuel is heated rapidly, whereby bubbles included in the fuel are expanded suddenly to generate a large amount of fuel vapor.

SUMMARY OF THE INVENTION

Accordingly, it is an object of the present invention to provide a device for supplying fuel to a diaphragm-type carburetor mounted to an engine, wherein the difference in temperature between the diaphragm-type carburetor and fuel introduced from a fuel tank into the carburetor can be decreased to inhibit the generation of fuel vapor in the diaphragm-type carburetor.

To achieve the above object, according to the present invention, there is provided a device for supplying fuel to a diaphragm-type carburetor which includes a constant-pressure fuel chamber which communicates at an outlet bore thereof with a lower end of a fuel nozzle through a fuel jet and a check valve, a fuel pump operated in response to a pulsation pressure in a pulsation pressure generating source to feed the fuel to the constant-pressure fuel chamber, and a fuel-introduction control valve for controlling the introduction of the fuel to the constant-pressure fuel chamber by opening and closing an inlet bore in the constant-pressure fuel chamber, a fuel supply passage leading to a fuel tank being connected to an intake side of the fuel pump, wherein the device further includes a fuel transfer means incorporated in an intermediate portion of the fuel supply passage and provided in an insulator which is interposed between the carburetor and the engine.

With this feature, due to the operation of the fuel pump of the diaphragm-type carburetor, in the course of the fuel in the fuel tank reaching the carburetor via the fuel supply passage, the fuel flows via the fuel transfer means in the insulator between the engine and the carburetor. The insulator is heated somewhat by the transfer of heat from the engine during operation of the engine for a long period of time and hence, the fuel flowing via the fuel transfer means in the insulator is also heated suitably. Therefore, the difference in temperature between the fuel exiting from the fuel transfer means and the carburetor heated to a relatively high temperature by the influence of the heat of the engine is decreased and thus, it is possible to avoid a sudden change in temperature of the fuel in the carburetor to inhibit the generation of fuel vapor.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to the accompanying drawings.

Figure 1:
FIG. 1 is a perspective view showing a power trimmer including an air-cooled engine, to which the present invention is applied, in service state.

Referring first to FIG. 1, an air-cooled engine E is formed into a hand-held type, and mounted to a driving section of a power trimmer Tr, for example. The power trimmer Tr is used with a cutting blade turned in all directions depending on the working state. Therefore, in each case, the engine E is tilted at a large angle, or turned upside down and in this way, the attitude of operation of the engine E is variable.

Figure 2:
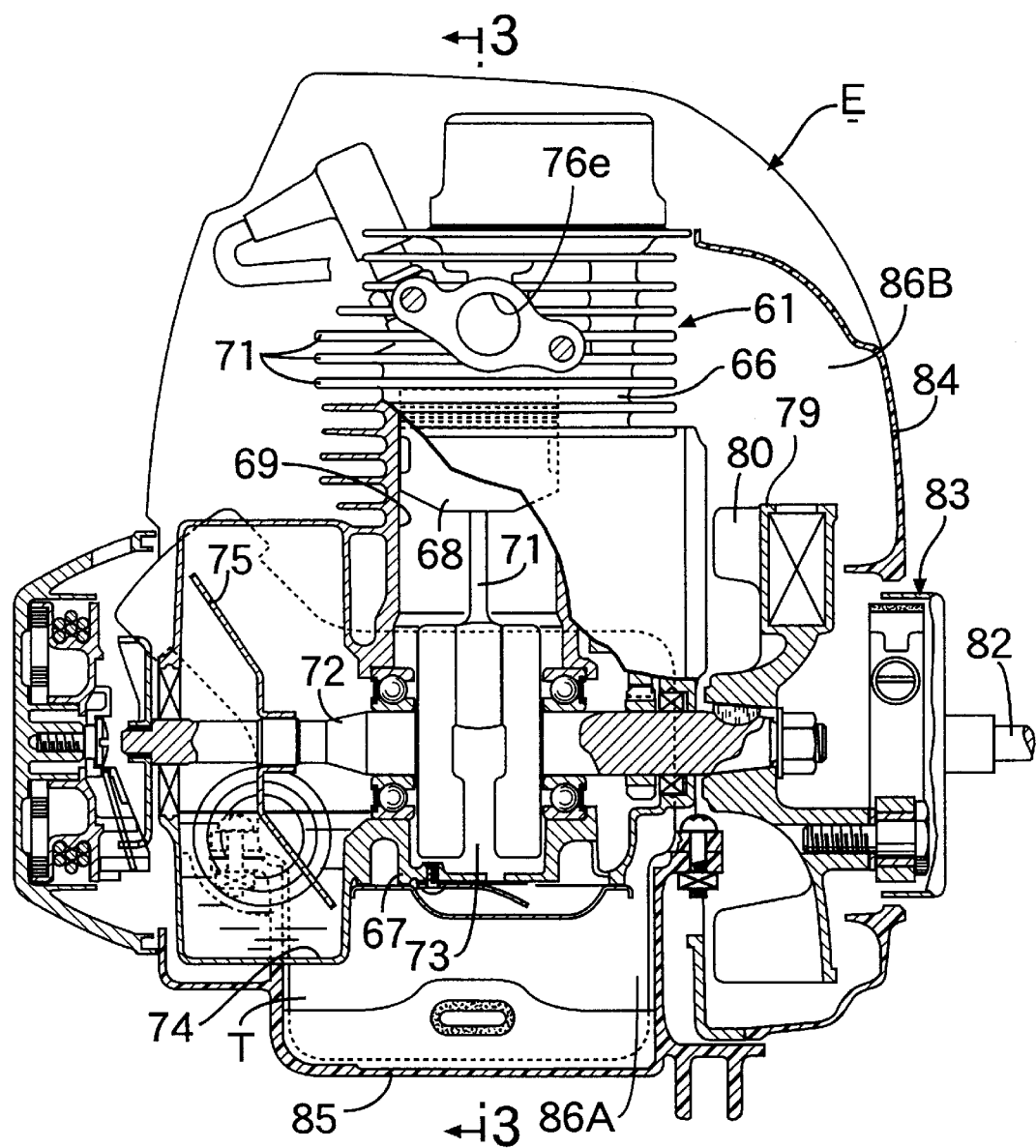
FIG. 2 is a vertical sectional front view of the engine.
Figure 3:
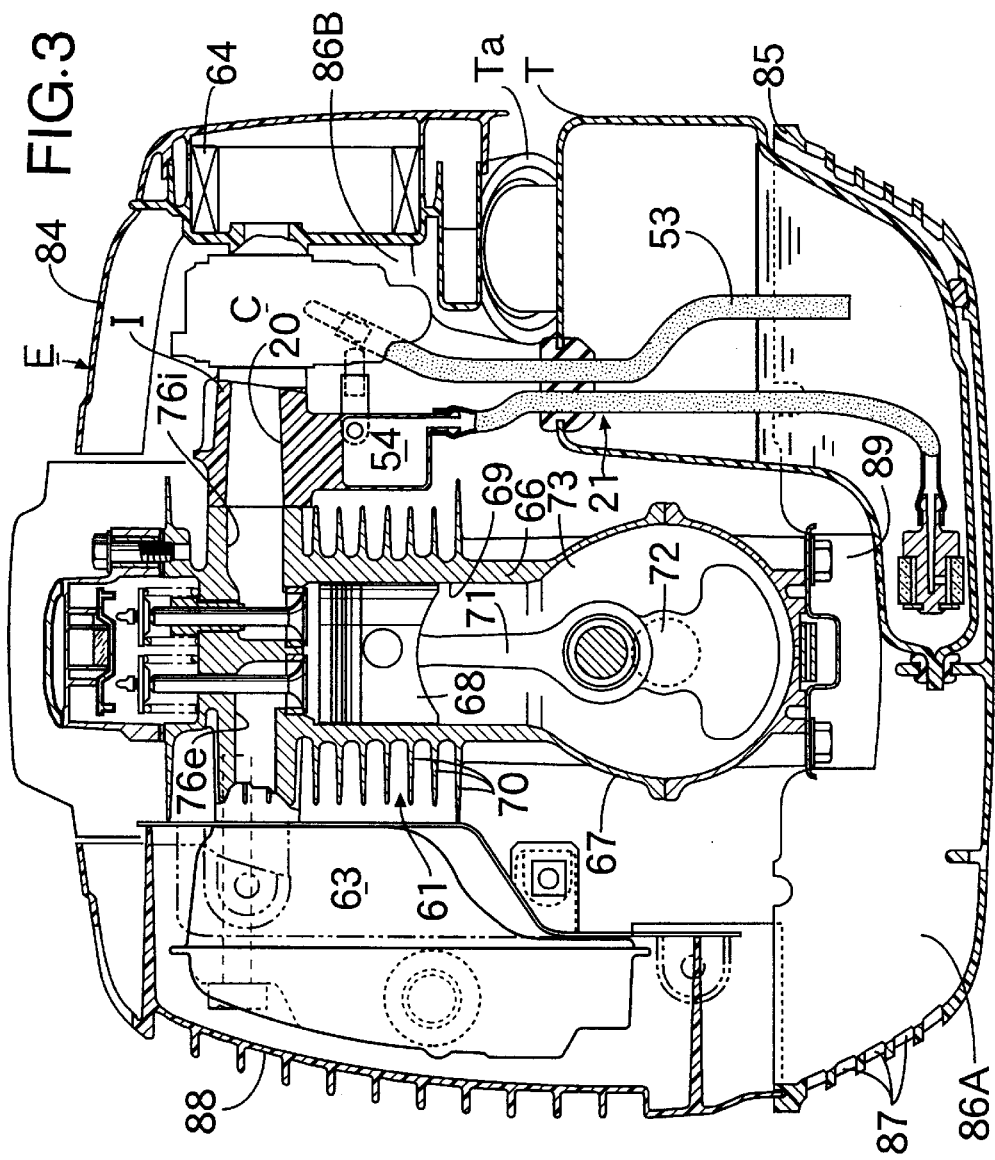
FIG. 3 is a sectional view taken along a line in FIG. 2.

Referring to FIGS. 2 and 3, a diaphragm-type carburetor C is mounted to one side of an engine body 61 of the air-cooled engine E with an insulator I of a synthetic resin interposed therebetween. The insulator I has an intake passage 20 connected to an intake port 76*i* in the engine body 61, and an air cleaner 64 is mounted at an inlet of an intake passage in the carburetor C. An exhaust muffler 63 is mounted to the other side of the engine body 61 and connected to an exhaust port 76*e* in the engine body 61. A fuel tank T is disposed at a lower portion of the engine body 61 and aside to one side of the engine body 61, and a fuel cap Ta is threadedly mounted in an injection port at an upper end of the fuel tank T.

The engine body 61 is comprised of a head-integral type cylinder block 66, and a crankcase 67 coupled to a lower end face of the cylinder block 66. The cylinder block 66 has, at its center portion, a single cylinder 69 in which a piston 68 is accommodated, and a large number of fins 70 are provided around an outer peripheral surface of the cylinder 69.

A crankshaft 72 is supported in the crankcase 67 and connected to the piston 68 through a connecting rod 71. An oil reservoir chamber 74 is defined at one end of the crankcase 67 adjacent a crank chamber 73, and an oil slinger 75 is secured to the crankshaft 72 for agitating an oil stored in the chamber 74 to produce an oil mist. The oil mist generated in the oil reservoir chamber 74 is supplied to various portions of the engine E to lubricate them.

A flywheel 79 having a cooling fan 80 is secured to one end of the crankshaft 72, and a centrifugal clutch 83 is interposed between the flywheel 79 and a working machine driving shaft 82.

Mounted to the engine body 61 are a baffle plate 84 surrounding peripheries of the flywheel 79 and the cylinder block 66, a muffler cover 88 covering the exhaust muffler 63, a bottom cover 85 covering a lower surface of the fuel tank T and that bottom surface of the engine body 61 which protrudes from the fuel tank T. A cooling-air inlet 87 is provided in a peripheral wall of the bottom cover 85, and a cooling-air upstream passage 86A is defined between a lower surface of the crankcase 67 and the bottom cover 85 to permit the cooling-air inlet 87 to communicate with a suction portion of the cooling fan 80. A draft clearance 89 is defined between the lower surface of the crankcase 67 and an upper surface of the fuel tank T to communicate with the cooling-air upstream passage 86A and an intake portion 80*a*.

A cooling-air downstream passage 86B is defined by the baffle plate 84 in a manner to surround the cylinder block 66 and the carburetor C, and permits a discharge portion of the cooling fan 80 to communicate with the inside of the muffler cover 88.

Thus, when the cooling fan 80 is driven in rotation by the crankshaft 72 during operation of the engine E, the open air flowing into the cooling-air inlet 87 in the bottom cover 85, i.e., the cooling air, is parted into air portions: (1) an air portion which flows through the cooling-air upstream passage 86A to cool the lower surface of the crankcase 67 of the engine E to reach the suction portion of the cooling fan 80, and (2) an air portion which flows from the cooling-air upstream passage 86A through the draft clearance 89 to cool the lower surface of the crankcase 67 and the upper surface of the fuel tank T to reach the intake portion 80*a*. In this manner, the crankcase 67 and the fuel tank T are effectively cooled by the cooling air. The cooling air passed through the cooling-air upstream passage 86A in the above manner is forced into the cooling-air downstream passage 86B by the cooling fan 80 to cool the cylinder block 66 and the carburetor C, and then enters the inside of the muffler cover 88 to cool the exhaust muffler 63.

Figure 4:
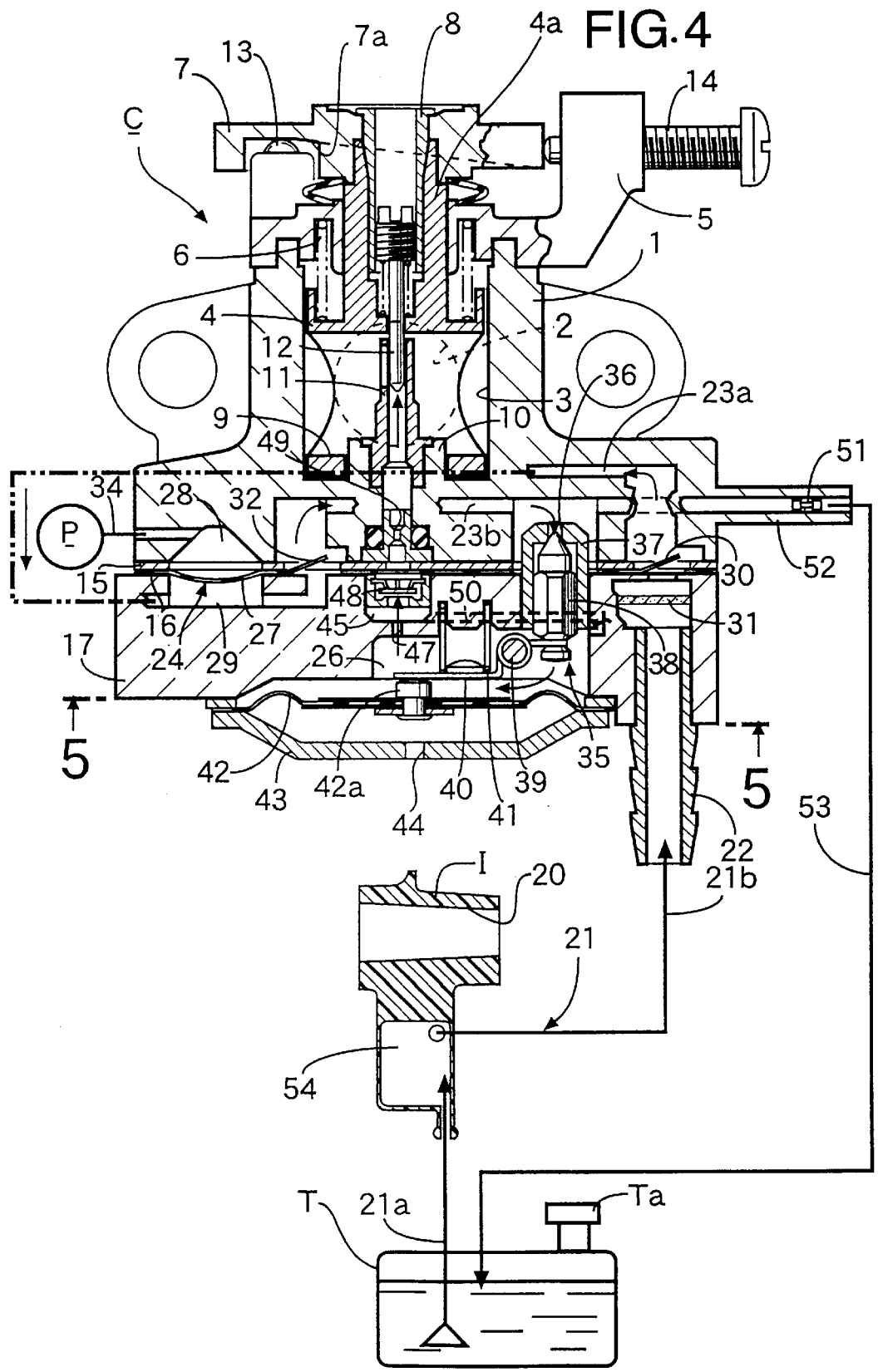
FIG. 4 is a vertical sectional view showing a diaphragm-type carburetor mounted to the engine and a device for supplying fuel to the diaphragm-type carburetor.
Figure 5:
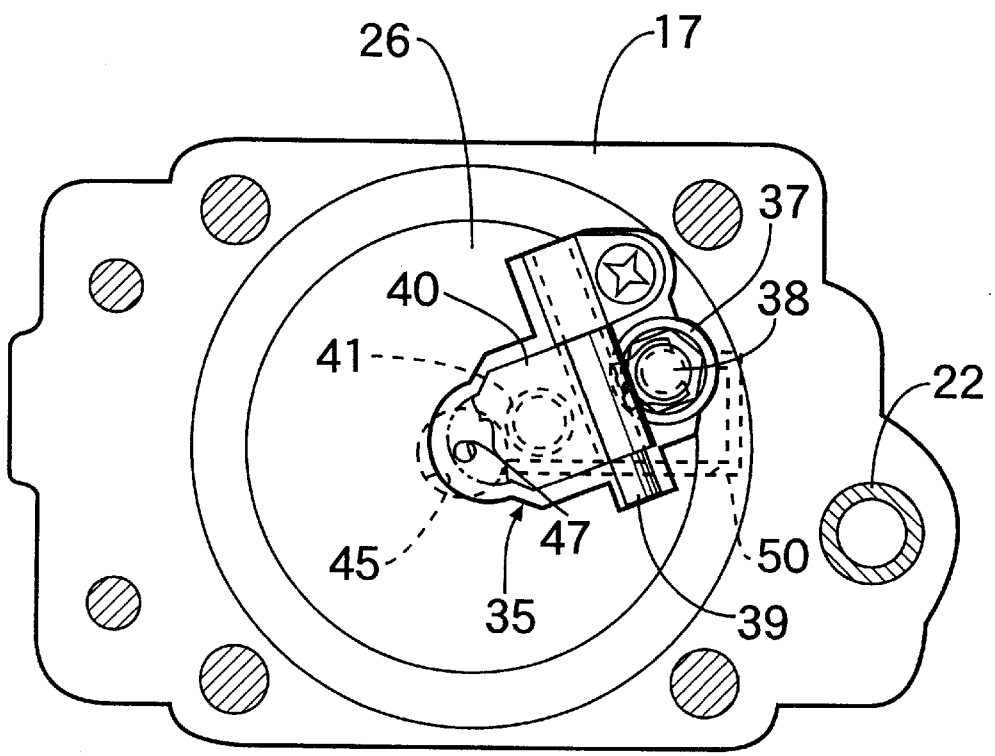
FIG. 5 is a sectional view taken along a line 5—5 in FIG. 4.

The diaphragm-type carburetor C and a device for supplying fuel to the carburetor C will be described with reference to FIGS. 3 to 5.

A carburetor body 1 of the diaphragm-type carburetor C includes a horizontal intake passage 2 communicating with the intake port 76*i* in the engine body 61 through the intake passage 20 in the insulator I, and a bottomed cylindrical valve guide bore 3 extending in a vertical direction perpendicular to the intake passage 2. A rotary-type throttle valve 4 is rotatably and slidably fitted in the valve guide bore 3, and a cap 5 closing the valve guide bore 3 is secured to the carburetor body 1. A spring 6 for biasing the throttle valve 4 toward the bottom of the valve guide bore 3 is mounted under compression between the throttle valve 4 and the cap 5. The throttle valve 4 has a throttle bore 9, the area of communication of which with the intake passage 2 is increased in response to the rotation of the throttle valve 4 in an opening-degree increasing direction.

The throttle valve 4 has a valve stem 4*a* passed through the cap 5, and an operating arm 7 is secured to the valve stem 4*a* by a sleeve 8 fitted in the hollow portion of the valve stem 4*a*.

A boss 10 is projectingly provided on the bottom of the valve guide bore 3 to protrude into the throttle bore 9, and a fuel nozzle 11 is mounted on the boss 10 and raised in the throttle bore 9. A needle valve 12 is inserted in the fuel nozzle 11 and threadedly mounted in the sleeve 8.

An annular slant 7*a* is formed on a lower surface of the operating arm 7 and supported by a ball 13 mounted on the upper surface of the cap 5. Thus, when the operating arm 7 is rotated in an opening direction of the throttle valve 4, the operating arm 7 is pushed up by the ball 13 and with this pushing-up, the throttle valve 4 is also displaced upwards along with the needle valve 12 against the biasing force of the spring 6, thereby increasing the opening degree of the fuel nozzle 11.

A stopper bolts 14 is threadedly engaged in the cap 5 for advancing and retreating movements and abutted against the operating arm 7 to limit the idle opening degree of the throttle valve 4.

A pressure plate 15, a resilient packing 16 and a bottom plate 17 are coupled to a lower surface of the carburetor body 1 in a sequentially superposed manner.

A joint 22 is projectingly provided on a lower surface of the bottom plate 17 at a location close to one side of the latter, and a fuel supply passage 21 connected to the fuel tank T is connected to the joint 22.

Provided in the carburetor body 1 and the bottom plate 17 are an upstream fuel passage 23*a* connected to the joint 22, and a diaphragm-type fuel pump 24 having a pump chamber 29 with which the upstream fuel passage 23*a* communicates. A downstream fuel passage 23*b* is provided in the carburetor body 1 and connected to the pump chamber 29, and a constant-pressure fuel chamber 26 is provided in the bottom plate 17 and connected to the downstream fuel passage 23*b*.

The diaphragm-type fuel pump 24 has a diaphragm 27 formed by a portion of the packing 16, and an operating chamber 28 and a pump chamber 29 are defined in the carburetor body 1 and the bottom plate 17, so that upper and lower surfaces of the diaphragm 27 face the operating chamber 28 and the pump chamber 29, respectively. Provided in the upstream fuel passage 23a are an intake valve 30 utilizing a portion of the packing 16, and a fuel filter 31 located upstream of the intake valve 30. A discharge valve 32 likewise utilizing a portion of the packing 16 is provided in the downstream fuel passage 23b. The operating chamber 28 communicates with the inside of a pulsating pressure generating source P, e.g., a crank chamber or an intake pipe in the engine through a conduit 34.

The constant-pressure fuel chamber 26 includes a fuel-introduction control valve 35 for controlling the introduction of fuel from the downstream fuel passage 23b to the constant-pressure fuel chamber 26. The fuel-introduction control valve 35 is comprised of a cylindrical valve seat member 37 which is fitted in the bottom plate 17 on one side of the constant-pressure fuel chamber 26 and having an inlet bore 36 provided in its upper end wall to face the downstream fuel passage 26b, a valve member 38 vertically movably fitted in the valve seat member 37 to open and close the inlet bore 36, an operating lever 40 swingably supported on a support shaft 39 supported on the bottom plate 17 with its one end engaged with a lower end of the valve member 38, a valve spring 41 for biasing the operating lever 40 in a direction to close the valve member 38, and a diaphragm 42 which is spread on a lower surface of the bottom plate 17 to form a bottom surface of the constant-pressure fuel chamber 26. An urging element 42a is provided at the center portion of the diaphragm 42 to abut against the other end of the operating lever 40, so that it can be moved away from the latter. The diaphragm 42 is fastened at its peripheral edge to the bottom plate 17 along with a cover 43 which covers the diaphragm 42. The cover 43 is provided with a ventilation bore 44 through which the atmospheric pressure is applied to a lower surface of the diaphragm 42.

A fuel well 45 is defined in the bottom plate 17 and located above the other end of the constant-pressure fuel chamber 26. The fuel well 45 communicates at its lower portion with the constant-pressure fuel chamber 26 through an outlet bore 47, and at its upper portion with a lower end of the fuel nozzle 11 through a check valve 48 and a fuel jet 49.

Further, a bypass passage 50 is provided in the bottom plate 17, and extends above the constant-pressure fuel chamber 26 to permit the lower end of the valve seat member 37 to communicate with the fuel well 45.

A joint 52 is projectingly provided on one side face of the carburetor body 1, and communicates with the downstream fuel passage 23b through the fuel jet 51 at a location short of the fuel-introduction control valve 35, and a surplus fuel return passage 21 is connected to the joint 52 with its terminal end opened into the fuel tank T.

A fuel transfer chamber 54 as a fuel transfer means is integrally defined in the insulator I, and the fuel supply passage 21 is disposed, so that the fuel transfer chamber 54 is incorporated in an intermediate portion of the fuel supply passage 21. The fuel supply passage 21 is comprised of an upstream fuel pipe 21a connected to the fuel tank T, and a downstream fuel pipe 21b connected to the joint 52 of the carburetor body 1. A downstream end of the upstream fuel pipe 21a and an upstream end of the downstream fuel pipe 21b are connected to one side and the other side of the fuel transfer chamber 54, respectively.

The operation of this embodiment will be described below.

When the engine E is operated, the pulsation pressure from the pulsation pressure generating source P is applied to the operating chamber 28 of the fuel pump 24 to vibrate the diaphragm 27. When the diaphragm 27 is flexed toward the operating chamber 28, the pump chamber 29 pumps the fuel in the fuel tank T through the intake valve 30 and the upstream fuel passage 23a by increasing the volume of the pump chamber 29. When the diaphragm 27 is flexed toward the pump chamber 29, the pump chamber 29 delivers the fuel in the chamber 29 to the downstream fuel passage 23b through the discharge valve 32 by reducing the volume of the pump chamber 29.

If the fuel in the constant-pressure fuel chamber 26 does not reach a defined amount at this time, the diaphragm 42 is displaced upwards by the atmospheric pressure to swing the operating lever 40 in a clockwise direction as viewed in FIG. 1 against the biasing force of the valve spring 41. This pulls down the valve member 38 to open the inlet bore 36 and hence, the fuel in the downstream fuel passage 23b is introduced into the constant-pressure fuel chamber 26. When the fuel introduced into the constant-pressure fuel chamber 26 reaches the defined amount, the diaphragm 42 is moved downwards to pull the urging element 42a away from the operating lever 40. Then, the operating lever 40 pushes the valve member 38 upwards by the biasing force of the valve spring 41 to close the inlet bore 36 and hence, the introduction of the fuel into the constant-pressure fuel chamber 26 is stopped. In this manner, the defined amount of fuel is always stored in the constant-pressure fuel chamber 26 during operation of the engine, and fills the fuel well 45 through the outlet bore 47.

In a state in which the inlet bore 36 has been closed by the valve member 38, the surplus fuel discharged from the fuel pump 24 is returned to the fuel tank T through the fuel jet 52 and the surplus fuel return passage 53.

On the other hand, a negative pressure is produced around the fuel nozzle 11 by passing of air drawn into the engine through the intake passage 2 and the throttle bore 9, and the fuel in the fuel well 45 is allowed to flow up sequentially through the check valve 48, the fuel jet 49 and the fuel nozzle 11 by the action of the negative pressure, and is ejected into the throttle bore 9. The ejected fuel is drawn into the engine, while being mixed with air passed through the intake passage 2 and the throttle bore 9 to produce an air-fuel mixture. The amount of air-fuel mixture supplied to the engine is regulated by the increasing and decreasing of the opening degree of the throttle valve 4.

The fuel in the fuel tank T pumped by the fuel pump 24 flows via the fuel transfer chamber 54 in the insulator I, while it passes through the fuel supply passage 21. The insulator I is somewhat heated by the transfer of heat from the engine E during operation of the engine for a long period of time, and hence, the fuel flowing via the fuel transfer chamber 54 is also heated suitably. Therefore, it is possible to decrease the difference in temperature between the fuel drawn into the fuel pump 24 of the carburetor C via the fuel transfer chamber 54 and the carburetor C heated to a relatively high temperature by the influence of the heat of the engine E, and to avoid a sudden change in temperature of the fuel in the carburetor C to inhibit the generation of fuel vapor.

However, if fuel vapor is generated from the fuel delivered from the fuel pump 24 to the downstream fuel passage 23b, the fuel vapor is passed through the valve seat member 37 and then immediately raised in the bypass passage 50 into the fuel well 45 and hence, such vapor is promptly ejected from the fuel nozzle 11 along with the fuel in the fuel well 45. Therefore, the amount of fuel vapor ejected from the fuel nozzle 11 per unit time is very small and thus, the air-fuel ratio of the air-fuel mixture is little varied, thereby making it possible to ensure the normal operation of the engine.

Although the embodiment of the present invention has been described in detail, it will be understood that the present invention is not limited to the above-described embodiment, and various modifications may be made without departing from the spirit and scope of the invention defined in claims. For example, the fuel transfer chamber 54 can be replaced by a zigzag fuel passage as the fuel transfer means of the insulator I.

What is claimed is:

1. A device for supplying fuel to a diaphragm-type carburetor which includes a constant-pressure fuel chamber which communicates at an outlet bore thereof with a lower end of a fuel nozzle through a fuel jet and a check valve, a fuel pump operated in response to a pulsation pressure in a pulsation pressure generating source to feed the fuel to said constant-pressure fuel chamber, and a fuel-introduction control valve for controlling the introduction of the fuel to said constant-pressure fuel chamber by opening and closing an inlet bore in said constant-pressure fuel chamber, a fuel supply passage leading to a fuel tank being connected to an intake side of said fuel pump, wherein said device further includes a fuel transfer means incorporated in an intermediate portion of said fuel supply passage and provided in an insulator which is interposed between said carburetor and the engine.

2. A device for supplying fuel to a diaphragm-type carburetor according to claim 1, wherein said fuel transfer means comprises a fuel transfer chamber.

3. A device for supplying fuel to a diaphragm-type carburetor according to claim 1, wherein said fuel transfer means comprises a zigzag fuel passage.

* * * * *